United States Patent
Sun

(10) Patent No.: US 7,815,316 B2
(45) Date of Patent: Oct. 19, 2010

(54) PROJECTOR HAVING DIGITAL MICROMIRROR DEVICE WITH THERMOELECTRIC COOLING CHIP ATTACHED THERETO

(75) Inventor: Ming-Chih Sun, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 440 days.

(21) Appl. No.: 11/959,238

(22) Filed: Dec. 18, 2007

(65) Prior Publication Data
US 2009/0086171 A1    Apr. 2, 2009

(30) Foreign Application Priority Data
Sep. 28, 2007    (CN)    ............. 2007 1 0201904

(51) Int. Cl.
*G03B 21/18*    (2006.01)
*G03B 21/00*    (2006.01)
*H01L 23/02*    (2006.01)
*F28F 7/00*    (2006.01)

(52) U.S. Cl. .................... 353/52; 353/31; 257/686; 165/80.3

(58) Field of Classification Search ............ 353/52, 353/56, 57, 119, 121, 31, 33, 61, 99; 62/3.2, 62/259.2; 250/216, 221; 165/80.3, 104.15, 165/104.31, 104.33, 185, 186; 257/531, 257/686, 690, 795
See application file for complete search history.

(56) References Cited

U.S. PATENT DOCUMENTS

| 6,428,170 B1* | 8/2002 | Haba ................. 353/119 |
| 2002/0124573 A1* | 9/2002 | Evans et al. ............ 62/3.2 |

FOREIGN PATENT DOCUMENTS

| CN | 1591166 A | 3/2005 |
| CN | 1836474 A | 9/2006 |
| CN | 1862371 A | 11/2006 |
| CN | 2872591 Y | 2/2007 |

* cited by examiner

*Primary Examiner*—Georgia Y Epps
*Assistant Examiner*—Don Williams
(74) *Attorney, Agent, or Firm*—Jeffrey T. Knapp

(57) ABSTRACT

A projector includes a digital micromirror device, a heat sink attached on the digital micromirror device and a thermoelectric cooling chip sandwiched between the digital micromirror device and the heat sink. The thermoelectric cooling chip includes a cold side contacting with the digital micromirror device and a hot side contacting with the heat sink.

9 Claims, 4 Drawing Sheets

PROJECTOR HAVING DIGITAL MICROMIRROR DEVICE WITH THERMOELECTRIC COOLING CHIP ATTACHED THERETO

BACKGROUND OF THE INVENTION

1. Field of the Invention

The present invention relates to a heat dissipation device for a projector, and particularly to a heat dissipation device incorporating a thermoelectric cooling chip for improving heat dissipation of a heat generating element in the projector.

2. Description of Related Art

Nowadays, projectors are commonly used in many fields such as meetings and presentations in an office or used as a home image output device. A projector such as a digital light processing projector, has an advantage in volume, weight and brightness compared to other type projectors. A digital micromirror device (DMD) is one of a pivotal imaging component in the digital light processing projector. Light emitted from a light source irradiates on the digital micromirror device, and is then reflected via the digital micromirror device and projects through projecting lens towards a screen to form images.

Since powerful light continuously irradiates on the digital micromirror device to assure the brightness of the projector, heat generated from the light is focused on the digital micromirror device. Usually a heat dissipation device is provided within the projector to cool heat generating components such as the digital micromirror device. However, due to the limitation of configuration and requirement of versatile applications of the projector, to intimately attach the digital micromirror device to the heat dissipation device sometimes becomes very difficult or even impossible, whereby the heat generated by the digital micromirror device cannot be effectively dissipated.

What is needed, therefore, is a projector with a heat dissipation device, which has a great heat dissipating capability. Furthermore, the heat dissipation device incorporates a thermoelectric cooling chip which can improve heat dissipation of a heat generating component in the projector.

SUMMARY OF THE INVENTION

A projector includes a digital micromirror device, a heat sink attached on the digital micromirror device and a thermoelectric cooling chip sandwiched between the digital micromirror device and the heat sink. The thermoelectric cooling chip includes a cold side contacting with the digital micromirror device and a hot side contacting with the heat sink.

Other advantages and novel features will become more apparent from the following detailed description of preferred embodiments when taken in conjunction with the accompanying drawings, in which:

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE INVENTION

Figure 1:
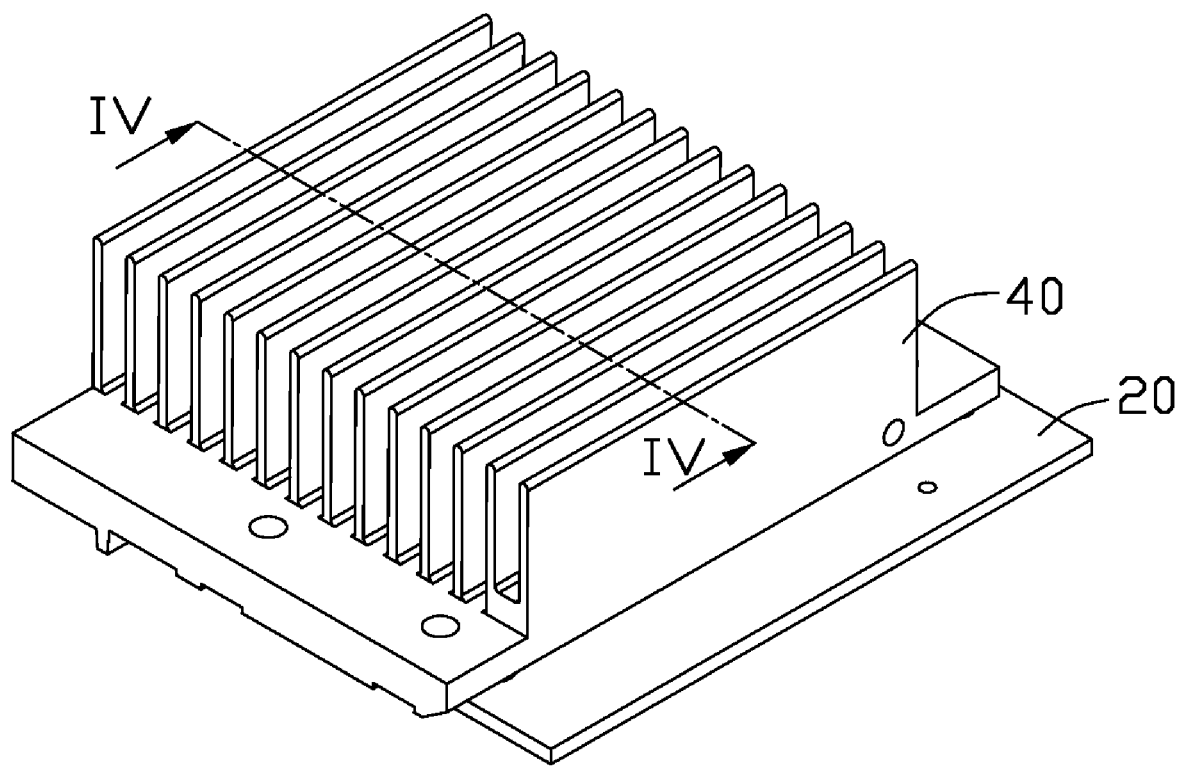
FIG. 1 is an isometric, assembled view of a heat dissipation device in a projector in accordance with a preferred embodiment of the present invention.
Figure 2:
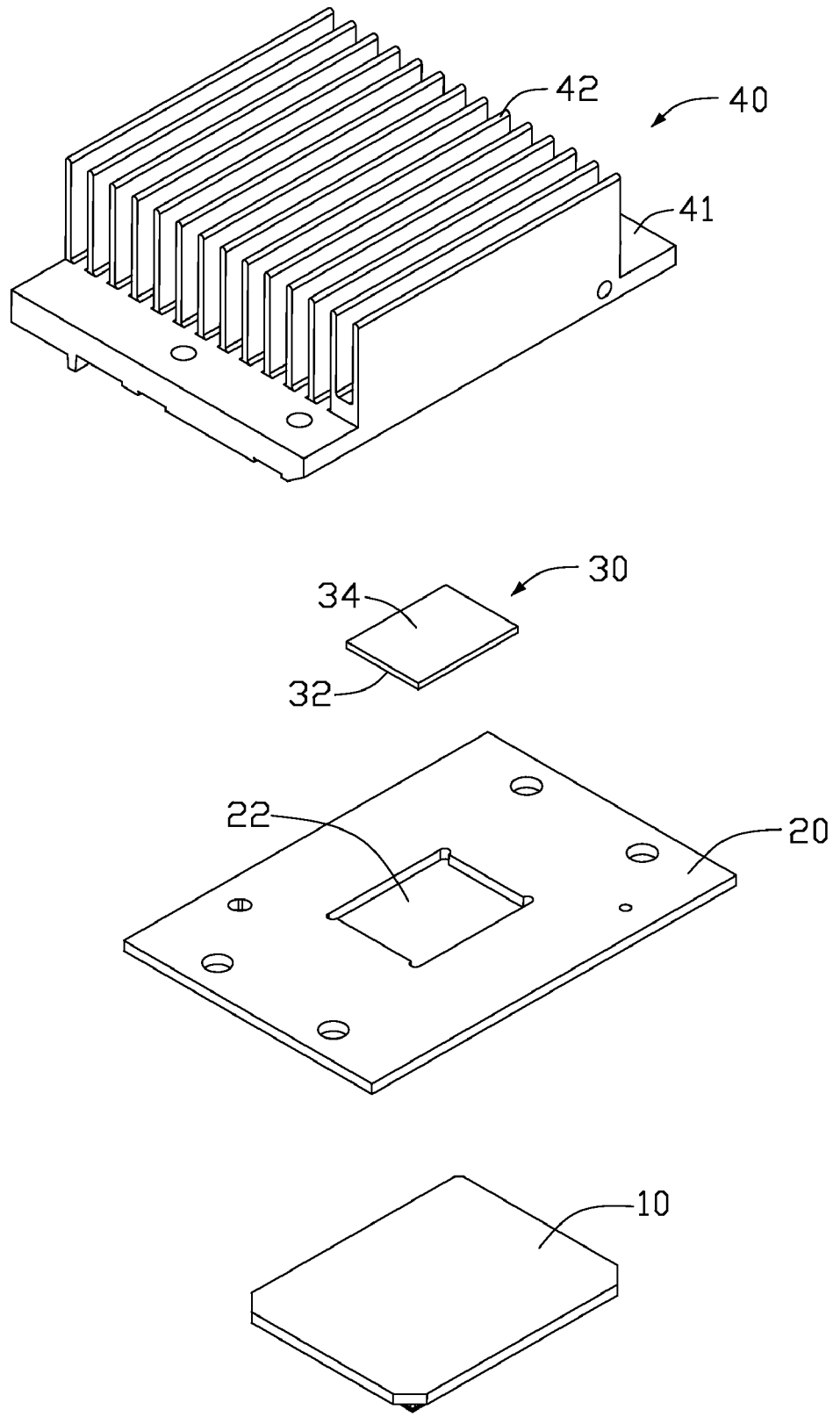
FIG. 2 is an exploded view of FIG. 1.

Referring to FIGS. 1-2, a heat dissipation device in a projector in accordance with a present embodiment is illustrated. The heat dissipation device comprises a heat sink 40 and a thermoelectric cooling chip 30 sandwiched between a top surface of the heat generating element 10 and a bottom surface of the heat sink 40. The heat dissipation device is used for dissipating heat generated from a heat generating element 10 in the projector having a high power. In the present embodiment, the projector is a digital light processing projector, and the heat generating element 10 is a digital micromirror device (DMD) located under a circuit board 20 of the projector.

Figure 3:
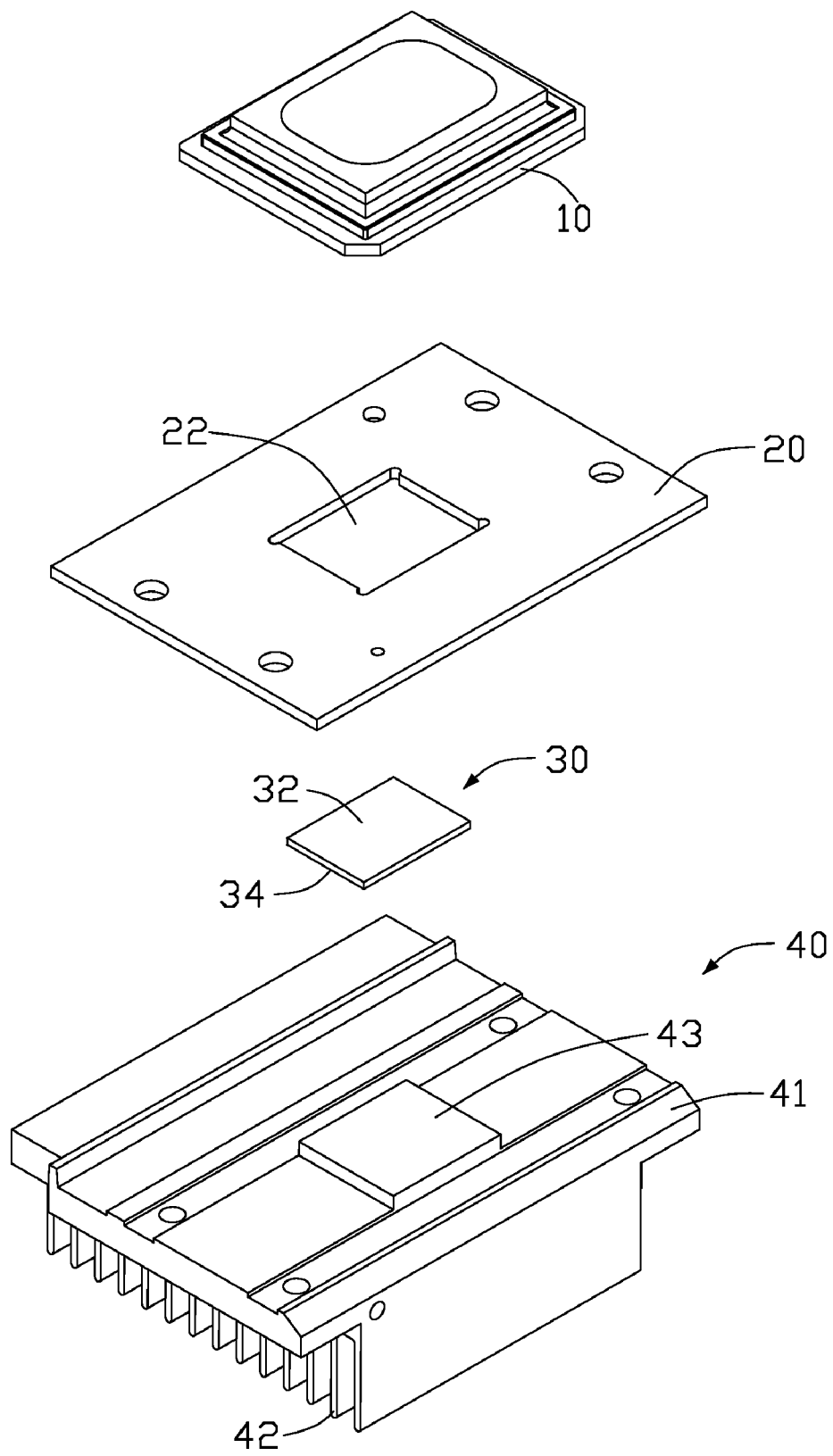
FIG. 3 is a view similar to FIG. 2, but shown from a different aspect.
Figure 4:
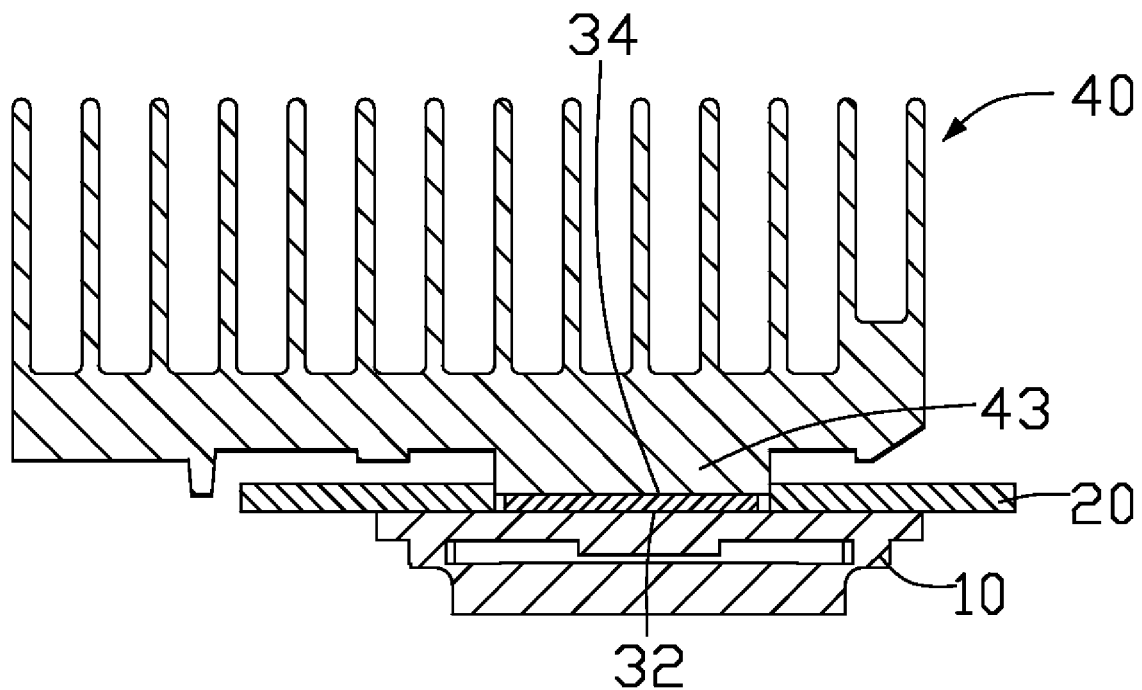
FIG. 4 is a cross-sectional view of FIG. 1, taken along line IV-IV thereof.

Please also referring to FIGS. 3-4, the heat generating element 10 has a top surface and a bottom surface thereof. The top surface of the heat generating element 10 is flat. A bottom surface of the heat generating element 10 is used for reflecting light from a light source in the projector.

The circuit board 20 is mounted on the top surface of the heat generating element 10 and electrically connected to the heat generating element 10 and the thermoelectric cooling chip 30 for providing electric signals to the heat generating element 10 and the thermoelectric cooling chip 30. A squared through hole 22 is defined at a substantial center portion of the circuit board 20 corresponding to a substantial center portion of the top surface of the heat generating element 10.

The thermoelectric cooling chip 30 is a thin squared plate and has a flat top and bottom surface. The thermoelectric cooling chip 30 is a common thermoelectric cooler having a high heat conducting efficiency, which includes solid state heat pumps that operate on the Peltier effect. When the thermoelectric cooling chip 30 is electrified, a hot side 34 is formed at the top surface thereof and a cold side 32 is formed at the bottom surface thereof. The thermoelectric cooling chip 30 is slightly smaller than the hole 22, whereby the thermoelectric cooling chip 30 can be positioned in the hole 22. The cold side 32 of the thermoelectric cooling chip 30 is mounted on the heat generating element 10. The thermoelectric cooling chip 30 is electrically connected with the circuit board 20.

The heat sink 40 can be made of metal such as copper, aluminum or an alloy of the two. The heat sink 40 comprises a squared base 41 and a plurality of fins 42 extending upwardly from a top surface of the base 41. A squared protrusion 43 extends downwardly from a bottom surface of the base 41. The protrusion 43 is located on a center portion of one lateral side of the bottom surface of the base 41. The protrusion 43 is slightly smaller than the hole 22 of the circuit board 20, whereby the protrusion 43 can be accommodated in the hole 22 to contact with the hot side 34 of the thermoelectric cooling chip 30. The heat sink 40 is spaced apart a distance from the circuit board 20 except the protrusion 43 on the heat sink 40 (clearly seen from FIG. 4). Since the protrusion 43 is formed at one lateral side of the heat sink 40 and the hole 22 is defined at the center portion of the circuit board 20, the heat sink 40 and the circuit board 20 are arranged in a staggered fashion, i.e., one lateral side of the circuit board 20 protrudes horizontally and outwardly from the heat sink 40. Other elements such as connectors (not shown) in the projector can be arranged on the one lateral side of the circuit board 20 protruding from the heat sink 40.

In assembly, the circuit board 20 is arranged on the top surface of the heat generating element 10, and the hole 22 of the circuit board 20 corresponds to the center portion of the top surface of the heat generating element 10. The thermoelectric cooling chip 30 is positioned in the hole 22 of the circuit board 20, with the cold side 32 thereof attached to the top surface of the heat generating element 10. The protrusion 43 of the heat sink 40 is arranged in the hole 22 of the circuit board 20 for attaching to the hot side 34 of the thermoelectric cooling chip 30.

A thermal interface material can be adhered on the cold side 32 of the thermoelectric cooling chip 30 to reduce a heat conducting resistance between the cold side 32 and the heat generating element 10. A thermal interface material can be adhered on the hot side 34 of the thermoelectric cooling chip 30 to reduce a heat conducting resistance between the hot side 34 and the heat sink 40.

Due to the high heat transferring efficiency of the thermoelectric cooling chip 30, heat from the heat generating element 10 can be quickly transferred to the heat sink 40, then dissipated to ambient air. Thus, the heat generating element 10 can be operated in a normal temperature. Furthermore, the thin flattened thermoelectric cooling chip 30 takes up a little space which can help to reduce a whole volume of the projector. Moreover, the thermoelectric cooling chip 30 directly connects with the heat generating element 10 and the heat sink 40, whereby a thermal transferring path is reduced, and the heat dissipation efficiency of the heat dissipation device in the projector is improved.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A projector comprising:
  a digital micromirror device;
  a heat sink attached on the digital micromirror device; and
  a thermoelectric cooling chip sandwiched between the digital micromirror device and the heat sink, the thermoelectric cooling chip having a cold side directly contacting with the digital micromirror device and a hot side directly contacting with the heat sink.

2. The projector as claimed in claim 1, wherein the thermoelectric cooling chip includes solid state heat pumps that operate on the Peltier effect.

3. The projector as claimed in claim 1, wherein the heat sink comprises a base and a plurality of fins extending from the base.

4. The projector as claimed in claim 3, wherein a protrusion extends downwardly from the base for contacting with the thermoelectric cooing chip.

5. The projector as claimed in claim 4, wherein a circuit board is located between the heat sink and the digital micromirror device, the circuit board defining a through hole therein for the protrusion and the thermoelectric cooling chip extending therethrough.

6. The projector as claimed in claim 5, wherein the heat sink is spaced apart a distance from the circuit board except the protrusion.

7. The projector as claimed in claim 5, wherein the protrusion is located on a center portion of one lateral side of the bottom surface of the base thereby forming a staggered fashion together with the circuit board, the other lateral side of the circuit board protrudes from the heat sink.

8. The projector as claimed in claim 1, wherein a thermal interface material is applied between the digital micromirror device and the thermoelectric cooling chip, and is applied between the thermoelectric cooling chip and the heat sink.

9. The projector as claimed in claim 1, wherein the thermoelectric cooling chip is thin flattened configuration.

\* \* \* \* \*